E. F. KAPUS.
ACETYLENE GAS GENERATOR.
APPLICATION FILED NOV. 14, 1910.

1,006,757.

Patented Oct. 24, 1911.

WITNESSES:
Luke Hinton.
John Hinton

INVENTOR.
Edward F. Kapus
BY George W. Hinton
ATTORNEY.

E. F. KAPUS.
ACETYLENE GAS GENERATOR.
APPLICATION FILED NOV. 14, 1910.

1,006,757.

Patented Oct. 24, 1911.

WITNESSES:
Luke Hinton
John Hinton

INVENTOR.
Edward F. Kapus,
BY George W. Hinton,
ATTORNEY.

E. F. KAPUS.
ACETYLENE GAS GENERATOR.
APPLICATION FILED NOV. 14, 1910.

1,006,757.

Patented Oct. 24, 1911.

WITNESSES:
Luke Hinton
John J. Hinton

INVENTOR.
Edward F. Kapus.

BY George W. Hinton,
ATTORNEY.

E. F. KAPUS.
ACETYLENE GAS GENERATOR.
APPLICATION FILED NOV. 14, 1910.

1,006,757.

Patented Oct. 24, 1911.

WITNESSES:
Luke Hinton
John Hinton

INVENTOR.
Edward F. Kapus
BY George W. Hinton.
ATTORNEY.

UNITED STATES PATENT OFFICE.

EDWARD F. KAPUS, OF ST. JOSEPH, MISSOURI.

ACETYLENE-GAS GENERATOR.

1,006,757.   Specification of Letters Patent.   Patented Oct. 24, 1911.

Application filed November 14, 1910. Serial No. 592,412.

*To all whom it may concern:*

Be it known that I, EDWARD F. KAPUS, citizen of the United States, residing at St. Joseph, in the county of Buchanan and State of Missouri, have invented certain new and useful Improvements in Acetylene-Gas Generators, of which the following is a specification, reference being had therein to the accompanying drawing.

My invention relates to improvements in acetylene gas generators, and the objects of my improvements are, first: to so construct an acetylene gas generator, that the operator thereof, in recharging the same, can not take the generator bell from the generator, until the gas therein has been forced therefrom through gas conducting means into storing means, back-flow of said gas from said storing means is prevented, water feeding means for said generator is closed, residual pressure of gas in said bell and generator has been exhausted therefrom into the open air, and a waste water cock has been opened for draining of water from said generator; and to render it impossible for said operator to inadvertently liberate gas from said machine, while performing the operations of recharging the same:—second; to so construct water conducting means and controlling means therefor, that after the operations of recharging and returning the parts to normal position have been performed by said operator, the water fed into said generator shall be so controlled that an abnormally large amount of gas shall not be generated: third; to provide machine controlling means, operable either at the machine, or at any desired point distant therefrom, whereby the gas generated and stored in the machine, can be promptly exhausted therefrom, into the outside atmosphere when desired, and the further generation of gas and consequent consumption of carbid in the generator be stopped; thus providing means for safety from escaping gas and further generation of same, in case of fire:— fourth; to so construct the parts of the water controlling means, that feeding of water into said generator is stopped by said generator bell, when the same is nearing the lowest point of its downward travel; thus providing means by which said water is conserved and flooding of the floor on which the machine stands is prevented:—fifth; to provide overflow conducting means whereby the height of water in said generator and around said bells is limited and waste water therefrom is directed into vessels, adapted to receive the same. I attain these objects by the mechanism illustrated in the accompanying drawing, in which:—

Figures 5, 6, 7, 8, 9, 10, 11, 12:
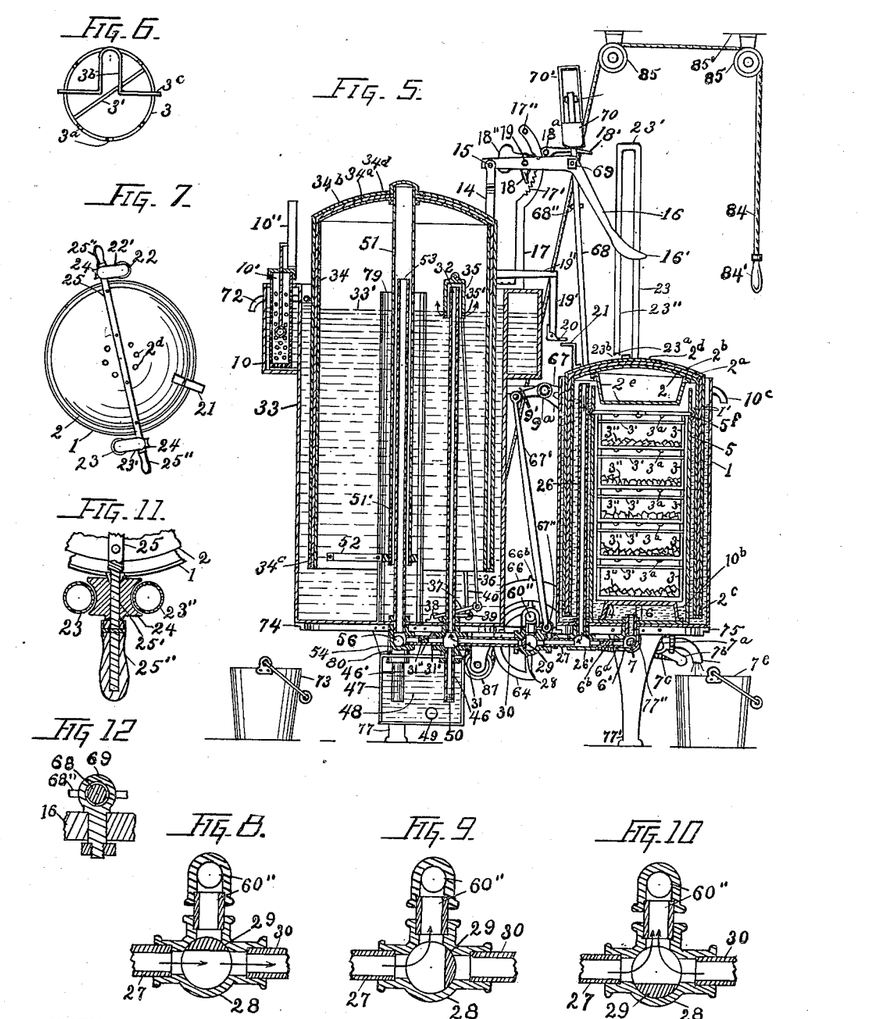
Fig. 5 is a vertical section on the line Z Z, seen in Fig. 2, looking from the rear of the machine, showing the valve lever gravitating and the other parts in position for recharging.
Fig. 6 is a top plan of a carbid pan and of the pan retainer.
Fig. 7 is a top plan of the generator compartment and of the generator bell, the latter being in position to be rotated laterally and removed from said generator.
Figs. 8, 9 and 10 are enlarged sections in detail similar to Fig. 1, showing the three positions of the gas directing cock gate.
Fig. 11 is an enlarged section in detail of one of the bell guiding means, cut horizontally on the line W W seen in Fig. 1, looking downward.
Fig. 12 is an enlarged section in detail of the valve lever rod and its guiding means, cut horizontally on the line V V seen in Fig. 1.

Referring to Fig. 5, in the generator tank 1, is the water seal 1', in which is submerged the lower end portion of generator bell 2, adapted to be raised by pressure of gas therein and to be lowered by the gravity thereof. Said gas is generated in carbid pans 3, mounted on the ordinary open stand 4 in generator compartment 5, and held down thereon by elastic pan retainer 3ᶜ, (see Fig. 6,) having the return bent handle portion 3ᵇ, adapted to be gripped in the hand of the operator, (not shown,) thereby compressed inward and placed with the outer ends thereof in groove 5ᶠ, formed around and in the upper end portion of generator compartment 5, seen in Fig. 5. Referring to Fig. 5, compartment 5 holds feed water 10ᵇ, which is fed into the same around said carbid pans, and the height of which is limited by overflow pipe 10ᶜ, adapted to direct water therefrom into bucket 7ᵉ. Said compartment 5 is provided with feed water inlet pipe 6, connected by four-way fitting 6′ with pipe 7, connected by four-way fitting 7′ (see Fig. 1,) with pipe 8, connected by glass tube water gage 9 with pipe 9′, closable by feed water cock 9″, having rotatable cock stem 9ᵃ. Said pipe 9′ has its upper end connected with tank 10 and is provided with the automatically operated controlling valve 11, (see Fig. 13,) for controlling flow of water through the described water conducting means, through which water is fed from tank 10 into generator compartment 5. Said water rises around carbid pans 3 and flows through notches 3ᵃ, formed in the upper edges thereof onto carbid 3″, thereby generating gas, the thus generated gas passes out through said notches and into bell 2, causing said bell to rise. Pipe 22ᶜ, (see Fig. 3,) connects fitting 6′ with fitting 22ᵈ, with which the lower end of guide 22 is connected.

Figure 1:
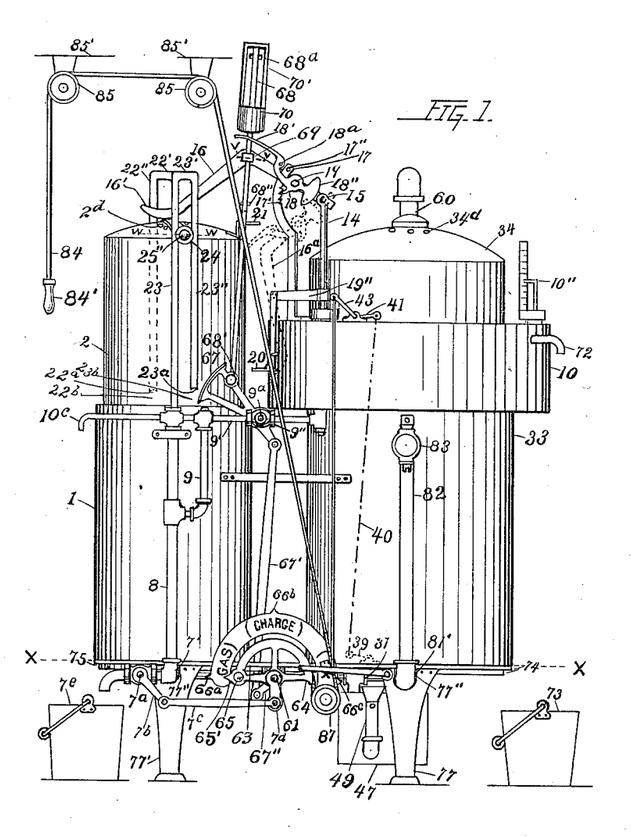
Figure 1 is a side elevation of the machine as it appears when in use.
Figure 13:
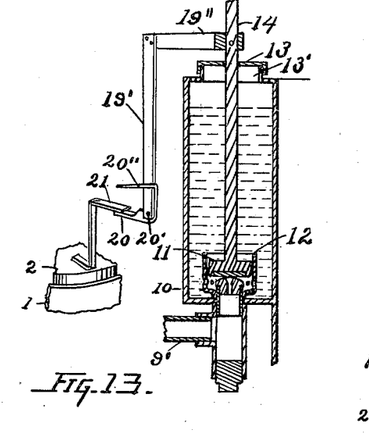
Fig. 13 is an enlarged vertical section through the center of the water controlling valve, and a perspective view of certain other parts, related thereto.
Figure 14:
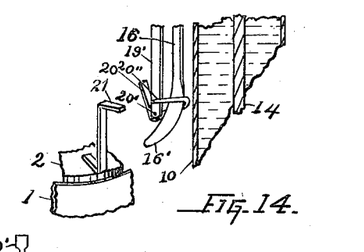
Fig. 14 is a perspective view similar to Fig. 13 with the valve omitted and the latch held clear of the bell bracket by the lower end portion of the valve lever.

Referring to Fig. 13, valve 11 is provided with valve stem 14 and with the annular perforated lower valve guide 12, secured to pipe 9′. Apertured cap 13 covers opening 13′, formed through the top of tank 10, and has stem 14 passed through the aperture in said cap as an upper guide for said valve and its stem. Referring to Fig. 1, the upper extremity of said stem is pivotally connected by pivot 15 with one end of valve lever 16, provided with weight 16′ formed on the free end thereof and projecting over the center of bell 2. Said weighted end is adapted to be lifted by said bell for closing said valve, and to be lowered by the gravity thereof for opening the same. Pawl 18, provided with pawl lever 18′, overbalance weight 18″ and stop stud 18ᵃ, is pivotally secured by pivot 19 to lever 16. Upright 17, provided with ratchets 17′, has its lower end secured on tank 10 and projects upward therefrom between lever 16 and pawl lever 18′, which form a guide for slidably guiding said lever in its hereinafter described upward and downward rotation on pivot 15. Ratchets 17′ are adapted to engage pawl 18. Upright 17 has stop pin 17″ in the upper extremity thereof, adapted to stop and limit the upward rotation of lever 16. Rigidly secured on valve stem 14, (see Fig. 13,) is the projecting arm 19″, provided with the depending arm member 19′, secured to the outer end thereof. To the lower end of said member 19′, the latch 20 is pivotally secured by pivot 20′. Said latch is provided with disengaging finger 20″, extending laterally from the upper edge thereof, and behind said depending member 19′ and adapted to limit the downward rotation of latch 20 on its pivot 20′. Said finger is adapted to be contacted and rotated by weighted end 16′ of lever 16, from the position seen in Fig. 13 to the position seen in Fig. 14, for removing latch 20 from the path of bracket 21, secured on and carried by bell 2. Said bracket is normally adapted to press downward upon said latch and thereby close valve 11, when said bell is fully lowered as seen in Fig. 13, and while lever 16 is in the position seen in Fig. 1, but supported by pawl 18, engaged with a ratchet 17′. The previously described action of lever 16 on latch 20 takes place when said lever is lowered as hereinafter described, and the former takes place when all of carbid 3″ is exhausted and all of the gas in bell 2 is used therefrom.

Generator bell 2, in its upward and downward travel is guided by the following described bell guiding means, seen in Figs. 1, 7 and 11. Bell guide 23 has its lower end secured to tank 1, extends upward therefrom and terminates in return bend 23′ from whence said guide extends downward as guide 23″. Guide 22, return bend 22′ and guide 22″ are similarly formed and secured. The lower ends of guides 22″ and 23″ are concaved as seen at 22ᵃ and 23ᵃ, in Fig. 1, and terminate leaving spaces 22ᵇ and 23ᵇ below said concaved ends, through which flanged guide wheels 24 are passed by lateral rotation of bell 2, for removing said bell from the described generator.

Referring to Fig. 11, said wheels are rotatably mounted on the rounded shank ends 25′ of handle bar 25, secured on the top of bell 2. Said wheels are retained in place thereon by handles 25″, secured on said shank portions, and are adapted to travel between and be guided by the described guides, thereby providing anti-friction guiding means for guiding bell 2. Should lever 16, from any cause fail to limit the upward movement of said bell, the same is stopped by return bends 22′ and 23′ which stop the described wheels in their upward travel. Bell 2 is provided with gas conducting pipe 26, (see Fig. 5,) which extends downward from a point above the level of the top of compartment 5, through the open bottom of said bell and through the bottom of tank 1, and is connected by T fitting 26′ with pipe 27, connected with gas directing cock 28, having cock gate 29 rotatable therein.

Figure 2:
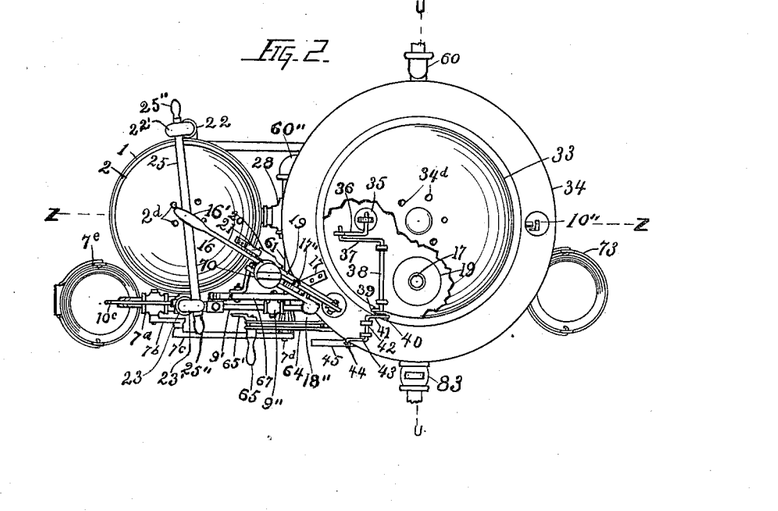
Fig. 2 is a top plan, certain parts being broken away to avoid obscurity.
Figure 3:
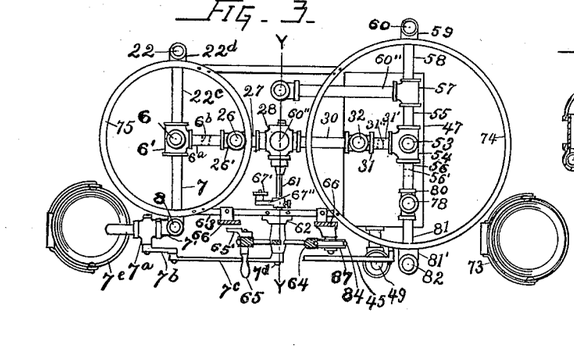
Fig. 3 is a horizontal section on the line X X, seen in Fig. 1, looking downward.

Pipe 6ᵃ is provided with gas tight plug 6ᵇ therein and connects fitting 6′ with fitting 26′, seen in Fig. 3. When said cock gate is in the position seen in Figs. 4, and 8 the same directs gas from the described generator into pipe 30, by which said cock is connected with four-way fitting 31. Gas inlet pipe 32 extends upward from said fitting 31, through the bottom of water seal tank 33, provided with water seal 33' therein, in which the lower open end of storage bell 34 is submerged. Pipe 31', having plug 31" therein, connects fittings 31 and 54. Surrounding the upper end of pipe 32, (see Figs. 2, 5 and 15) is the water seal cap 35, the lower end of which is submerged in water seal 33', and provided with apertures 35' formed therethrough, for spraying gas, as the same passes therethrough into water seal 33', for cleansing and cooling said gas. Said cap also provides water sealing means, whereby the upper end of pipe 32 is at all times sealed; which prevents return flow of gas from storage bell 34 into the previously described generator. The described parts form gas conducting means, whereby gas is conducted from generator bell 2 into storage bell 34. From said bell gas is conducted to any desired system of gas distributing pipes, not shown, through the following described gas outlet means.

Figure 16:
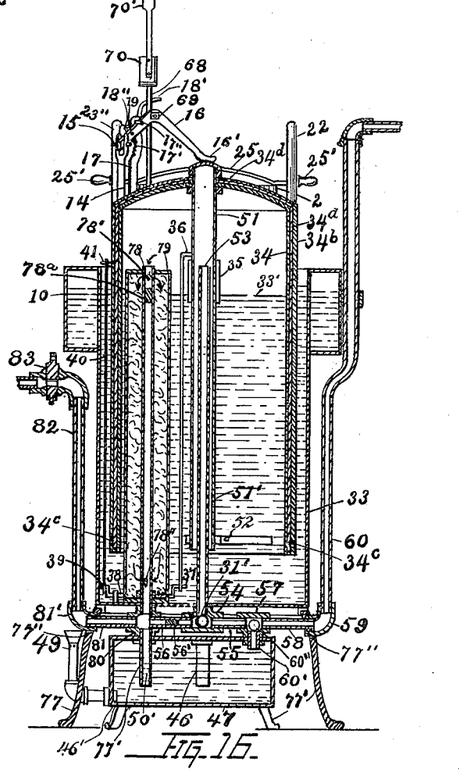
Fig. 16 is a vertical section on the line U U seen in Fig. 2, looking toward the left.

Referring to Fig. 16, said gas passes into the upper end portion of filter pipe 78, thence through apertures 78' through said pipe, into filter 79, downward therethrough and thence through apertures 78" into the lower end portion of said filter pipe, (provided with gas tight plug 78ª therein between said apertures,) thence through four-way fitting 80, pipe 81, L fitting 81', pipe 82 and cock 83 to the before mentioned system of gas distributing pipes. Fittings 53 and 80 are for strength, secured together by pipe 56, having gas tight plug 56', therein.

Referring to Figs. 5 and 16 respectively, connected with fittings 31 and 80 are the relief pipes 46 and 46', extending downward therefrom, through and secured to the top of water seal box 47 provided with water 48 therein and with fill tube 49. Said water 48 rises in said water seal pipes and forms water seals 50 and 50', respectively therein.

Figure 4:
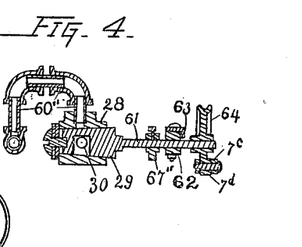
Fig. 4 is a vertical section of the gas directing cock and its pipe connections, on the line Y Y, seen in Fig. 3, looking toward the right.

Storage bell 34 is provided with the following described pressure relieving means. Sleeve guide 51 has the closed upper end thereof secured to the top of said bell and its lower end braced by transverse brace 52, the ends of which are secured to the interior of said bell. Said sleeve has apertures 51' formed through the lower portion thereof, adapted to be lifted by bell 34 above the top of water seal 33'. Said sleeve is slidably guided on guide pipe 53, which acts both as a guide for said bell and as an exhaust or relief pipe therefor, when said sleeve guide apertures are raised by excessive pressure of gas in said bell, as previously stated. Referring to Fig. 16, the lower end of said guide pipe is connected with the following pressure relief and exhaust conducting parts, connected in the order named:—fitting 54, relief pipe 55, fitting 57, exhaust pipe 58, L fitting 59 and vertical exhaust pipe 60. With the lower portion of fitting 57 is connected the relief nipple 60' extending downward therefrom, through and secured to the top of box 47, for communicatively connecting the upper portion of said box with the previously described exhaust conducting parts. By pass exhaust pipes 60" connect said exhaust conducting parts with gas directing cock 28, as seen in Figs. 3, and 4.

Figure 15:
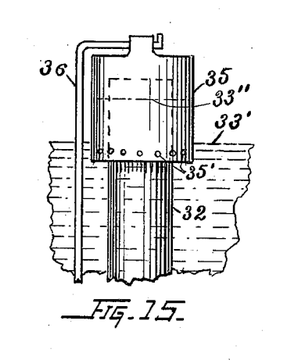
Fig. 15 is an enlarged side elevation in detail of the scrubber cap.

Referring to Figs. 5 and 15, water seal cap 35 is lifted above water seal 33' for opening pipe 32, when it is desired to exhaust gas from bell 34, through said pipe, and pipe 30, into and through cock 28, and the previously described by-pass exhaust conducting means. Said cap 35 is thus lifted by connecting rod 36, pivotally connecting said cap with crank 37, formed with counter-shaft 38, rotatably mounted on the bottom of tank 33 and having crank 39 formed on the opposite end thereof. The free end of said crank is connected by pull wire 40, (indicated by dot and dash line in Fig. 1,) with crank 41, formed with shaft 42, (see Fig. 2,) rotatably mounted on water tank 10 and provided with crank 43 on the opposite end thereof, connected by pull rod 44 with the central portion of treadle 45, one end of which is pivotally secured to leg 77, (see Fig. 1,) and the other or free end adapted to be depressed by handle 65 when the same is rotated to the full limit of its rotation, with 65 in register with point 66ᶜ.

Cock gate 29 is provided with stem 61, the outer end portion of which is rotatably supported in box 62, secured to stand piece 63 and has grooved crank segment 64 secured on the outer end thereof. Said segment is provided with crank handle 65, secured thereto and with pointer 65' adapted to be moved by said segment into register with the points 66ª, 66ᵇ and 66ᶜ, on index plate 66 and thereby show the position to which cock gate 29 is rotated, as seen in Fig. 1. Said index plate is secured to stand piece 63. Rotatably mounted on said index plate, below point 66ᶜ is the grooved pulley 87. The lower end of operating cable 84 is secured to segment 64, near pointer 65', and is passed over and on said segment, thence under pulley 67 and extends upward therefrom over pulleys 85 rotatably secured to any fixed object 85'. Said cable is thus extended to any desired point distant from the described machine for rotating said cock gate. Said cable is provided with handle 84', heavy of weight for keeping said cable taut, and by which to pull said cable, when the crank handle 65 is inaccessable by reason of fire.

Referring to Fig. 1, waste cock 7ª is provided with crank 7ᵇ connected by connecting rod 7ᶜ with crank 7ᵈ, secured on the outer end of cock stem 61, for automatically opening said cock when pointer 65' is rotated to point 66ᵇ, with cock gate 29 in the position seen in Fig. 5, for draining water from compartment 5 into bucket 7ᵉ, when the described generator is to be emptied and be recharged with fresh carbid as hereinafter described. Referring to Fig. 1, bell guide gate 67 is secured on the stem 9ᵃ of water feed cock 9'', and is provided with connecting rod 67' connecting the right end of same with crank 67'', secured on cock stem 61, for rotating both the stem of cock 9'' and the gate 67, when stem 61 is rotated as previously described. This latter operation closes feed water cock 9'' and removes gate 67 from in front of space 23ᵇ, for allowing passage therethrough of bell guide wheel 24.

The lower end of valve lever rod 68 is pivotally secured at 68' to gate 67, and extends therefrom upward through apertured rotatable guide stud 69, rotatably secured to valve lever 16, best seen in Fig. 12. Said rod 68 is provided with stud pin 68'' secured therein and adapted to lift lever 16 from the position indicated by dotted lines 16ᵃ, seen in Fig. 1, to the position seen in Fig. 5, when cock gate 29 is reversely rotated. Rod 68 has pull pin 68ᵃ, adapted to pull weight 70 downward. Pawl releasing weight 70 is slidably mounted on the upper end portion of rod 68 and has its downward movement thereon limited by yoke 70', secured at its lower end to said weight and passed over and adapted to rest on the upper end of said rod. Said weight is adapted to gravitate onto pawl lever 18', overcome the weight of pawl weight 18'' and rotate said pawl on pivot 19, from engagement with ratchets 17', for lowering lever 16 by the gravity thereof, from the position seen at 16 to the position indicated by dotted lines 16ᵃ, in Fig. 1, for removing said lever from over bell 2, while the previously described operations of recharging are being performed.

Water seal tank 33 is provided with overflow pipe 72, which passes through tank 10 and is adapted to direct any excess of water from tank 33 into bucket 73.

The heretofore described parts of the machine are mounted on a stand comprising ring 74, beneath tank 33, ring 75 beneath tank 1, the rear stand piece 76 and the front stand piece 63, by which said rings are secured together, and the three legs 77' and the leg 77 on which said rings are mounted. Said legs have openings 77'' therethrough, for reception and support of the pipes. Bell 2 is lagged with sheet asbestos 2ᵃ, covered with sheet metal jacket 2ᵇ, said jacket having a row of apertures 2ᶜ, formed therethrough around and near the lower edge thereof, for admission of water into said asbestos the capillary attraction of which causes said water to rise therethrough and keeps bell 2 cool. Rapid evaporation of water, caused by fire outside the machine would generate steam in said asbestos, which escapes therefrom through apertures 2ᵈ formed through the top of said jacket. Bell 34 is provided with asbestos lagging 34ᵃ, covered by jacket 34ᵇ, provided with apertures 34ᶜ and 34ᵈ, identically the same in construction and operation as the lagging and jacketing of bell 2. Space filler 2ᵉ is carried by bell 2, for expelling gas from the generator, when in position seen in Fig. 5.

In the operation of my invention, with the parts in position seen in Fig. 1, water is fed as described on carbid 3'', thereby generating gas, which passes through the gas conducting means from bell 2 into bell 34, being scrubbed cooled and cleaned by passage through water 33'. Said gas passes therefrom through the gas outlet conducting means, from whence said gas is used through distributing means not shown, until all of said carbid is exhausted of gas. When said carbid has thus been slaked or exhausted, the described generator is recharged with fresh carbid, in the following manner. Generator bell 2 is forced downward, from the position seen in Fig. 1 to the position seen in Fig. 5 and laterally rotated to the position seen in Fig. 7, with guide wheels 24 in spaces 22ᵇ and 23ᵇ and held down by the concaved ends 22ᵃ and 23ᵃ of guides 22'' and 23''. This forces all the gas from bell 2, through the described gas conducting means into storage bell 34. At this juncture it will be understood that gate 67 prevents farther movement of wheels 24. The operator now, by handle 65 rotates cock gate 29 from the position seen in Figs. 1 and 8 to the position seen in Figs. 5 and 9; thereby prevents back flow of gas from bell 34, and by the previously described rod and crank connection, closes feed water cock 9'', lowers rod 68, and at the same time opens waste water cock 7ᵃ, and rotates gate 67 from in front of space 23ᵇ. As rod 68 is thus lowered the same carries lifting stud 68'' downward and at the same time lowers pawl releasing weight 70 onto pawl lever 18', by the gravity of which said pawl is released from ratchets 17', thus removing all support from beneath the free end portion of lever 16, which gravitates from the position seen in Fig. 1, to the position indicated by dotted lines 16ᵃ. Generator bell 2 (as seen in Fig. 7,) is still farther rotated from beneath guides 22' and 23'' and by handles 25'' is lifted from compartment 5. Handle portion 3ᵇ of pan retainer 3ᶜ is grasped, compressed and removed from said compartment. Pans 3 are lifted by rods 3', (see Fig. 5,) from said compartment 5, cleaned, recharged with fresh carbid 3″, after which said pans, pan retainer and bell 2 are replaced.

After the described recharging is done, the operator, by handle 65 rotates cock gate 29 back from the position seen in Fig. 9 to the position seen in Fig. 8, and thereby reestablishes communication between bells 2 and 34. At the same time the reverse movement of the parts connected with handle 65, moves said parts back to the position seen in Fig. 1, except the parts lifted by rod 68, which are lifted by lift stud 68″, (on said rod) to the position seen in Fig. 5, with the free end portion of lever 16 supported by pawl 18 resting in one of the ratchets 17′. Gas is again generated as previously described, and raises bell 2 until the top of same lifts the weighted end 16′ of lever 16; while such is done the gravity of said lever and its attached parts causes valve 11 to thereby be closed.

The closing of valve 11, as previously described, stops feeding of water from tank 10 onto carbid 3″, but the previously fed water continues to act on said fresh carbid for a short time thereafter, continuing the generation of gas and thereby raises bell 2 which lifts the free end of lever 16 and carries pawl 18 into engagement with the next higher ratchet 17′.

When pressure of gas in bell 2 is lowered by use of same through cock 83, (see Figs. 1, 2, and 16) said bell is thereby caused to move downward from weighted end 16′ of lever 16, which latter is fulcrumed on pawl pivot 19, supported by engagement of pawl 18 with said ratchet 17′. The thus supported lever 16, by reason of gravity of weight 16′, opens valve 11, again admitting water into compartment 5 onto carbid 3″ by which gas is again generated. These operations are repeated until the upward travel of lever 16 is stopped by stud 17″, which thereby stops farther upward movement of bell 2, after which any excessive amount of gas generated, passes from bell 2 through the previously described gas conducting means into storage bell 34, thereby causing said bell also to rise, with the parts in position seen in Fig. 1.

In gas machines of this character, where water is continually fed onto the carbid, throughout the full upward travel of the generator bell, the volume of water in the lower one of pans 3 becomes so excessive as to cause generation of gas after both the generator bell and the storage bell have thereby been caused to reach the full limit of their upward travel, and frequently surplus gas is exhausted through the previously described storage bell relieving means, thereby entailing a waste of carbid. In such machines this waste of carbid, caused by abnormal generation of gas, takes place most frequently in cases where gas is not used for some length of time after recharging the generator. All of the said abnormal generation of gas and consequent loss of carbid is obviated by the use of the previously described feed-water valve controlling means. When it is desired to exhaust all the gas from the entire machine, cock gate 29 is rotated, either by crank handle 65 or by handle 84′, from the position seen in Figs. 1 and 8 to the position seen in Fig. 10, indicated by pointer 65′ being in register with point 66ᶜ, on index plate 66. This position of said cock gate 29 places the previously described gas conducting means in communication with said cock, both from bells 2 and 34 and opens communication between the same and by-pass exhaust conducting pipes 60″, leading into exhaust pipe 60, through which all of said gas is exhausted into the open air. Pipe 32 forms a part of said gas conducting means and to permit said gas to exhaust therethrough, is opened at its upper end by lifting cap 35 above water seal 33′. This is done by movement of crank handle 65 against the free end of treadle 45, connected with said cap by the previously described rod, shaft and crank connections. This latter movement of the parts, by the previously described rod and crank connections with cock stem 61, causes feed water cock stem 9ᵃ, gate 67, rod 68 and the weighted end 16′ of lever 16, to move from the position seen in Fig. 1, to the previously described position to which the parts are moved for recharging the generator. During said movement, waste water cock is opened while pointer 65′ is passing point 66ᵇ and again closed, thereby draining a small amount of water from compartment 5 into bucket 7ᵉ. This movement of the parts closes the feed water conducting means, lowers the water in compartment 5, and thereby stops further generation of gas.

During the formerly described operations of recharging the generator, should the operator inadvertently rotate the cock gate 29 back from the position seen in Figs. 5 and 9, to the position seen in Fig. 8, before replacing bell 2 in the generator, pressure of gas in cap 35 would find exit therefrom through pipes 32 and 30, cock 28 and pipes 27 and 26, in an inappreciable quantity. When such is done pressure of gas in storage bell 34 above the water seal 33′, (see Fig. 5,) forces a portion of the water forming said water seal into cap 35, and forms water seal 33″, (see Fig. 15,) therein and around the upper end portion of pipe 32, effectually preventing back flow of gas therethrough from bell 34, and danger from liberated gas.

Figure 17:
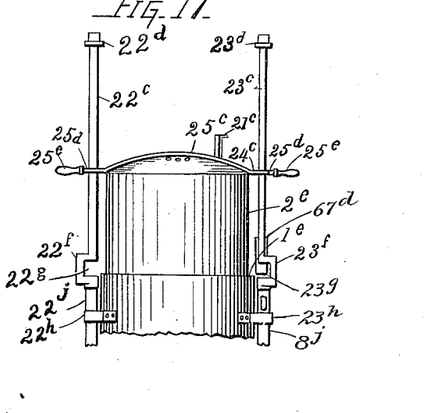
Figs. 17 and 18 show one of the other various forms in which the bell guiding means may be constructed.
Figure 18:
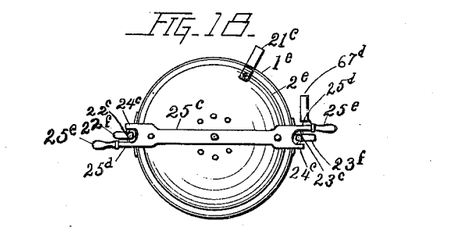

While I have shown and described the generator bell guiding means in the foregoing manner, it is evident that different forms of guiding members, carried by said bell, and differently supported vertical guides, with open spaces thereunder, could be constructed without departing from the spirit of my invention. One of such different forms of guiding members and differently supported guides is seen in Figs. 17 and 18, in which handle bar 25ᶜ is secured on the top of bell 2ᵉ, and has a guiding member 24ᶜ and a shank end portion 25ᵈ with a space between them, formed on each end thereof, and a handle 25ᵉ on each of said shank end portions. Vertical guides 22ᶜ and 23ᶜ are supported respectively by the offsets 22ᶠ and 23ᶠ which form spaces 22ᵍ and 23ᵍ respectively beneath the lower ends of said vertical guides, one of which is closed by movable gate 67ᵈ, the construction and operation of which is identical with gate 67 seen in Fig. 1 and previously described. The same is true of the supports below said offsets.

Vertical guides 22ᶜ and 23ᶜ extend upward from their respective offsets, between the previously described members 24ᶜ and shank end portions 25ᵈ, for vertically guiding the same, the upward travel of which is limited by stop caps 22ᵈ and 23ᵈ secured on the respective upper ends of vertical guides 22ᶜ and 23ᶜ, seen in Fig. 17 and removed from said guides in Fig. 18, to avoid obscurity.

Having fully described my invention, what I claim as new and desire to secure by Letters Patent is:—

1. In an acetylene gas generator, a generator adapted to have acetylene gas generated therein; storing means for storing said gas said storing means being provided with seal water therein; gas conducting means adapted to conduct gas from said generator into said storing means; a gas directing cock in said gas conducting means, said cock being provided with a gas directing cock gate therein and with gate rotating means therefor said gate being adapted while in normal position to direct gas from said generator into said storing means, and to otherwise direct said gas when rotated from said normal position; a gas inlet pipe in said storing means said pipe being extended upward through said seal water and forming a part of said gas conducting means; a water seal cap over the upper end of said pipe the lower edge of said cap being submerged in said seal water for forming a water seal therein around the upper end portion of said pipe, and cap lifting means operated by said cock gate rotating means whereby said cap is lifted above said water when said gate rotating means is rotated from its normal position to the limit of its rotation.

2. In an acetylene gas generator, a generator; a generator bell adapted to be moved downward by the gravity thereof and to be moved upward by volume of gas therein; gas storing means; a water tank; water conducting means adapted to conduct water from said tank into said generator; gas conducting means for conducting gas from said generator into said storing means; a rotatable gas directing cock gate in said gas directing means; cock gate rotating means for rotating said cock gate; a valve for controlling flow of water through said water conducting means, said valve being provided with a valve stem therefor; a valve lever having one of its ends pivotally secured to said valve stem and its opposite free end provided with a weight thereon projected over the top of said generator bell and adapted to be lifted thereby for closing said valve; lever guiding means for guiding said valve lever; a plurality of ratchets formed in said guiding means; a pawl adapted to engage said ratchets, said pawl being pivotally secured to said valve lever and adapted to form a movable fulcrum for the central portion of the same; lifting means for lifting the free end portion of said valve lever; pawl releasing means adapted to release said pawl from said engagement with said ratchets and moving means connecting said cock gate rotating means with said lifting means whereby said lifting means and said pawl releasing means are moved upon rotation of said cock gate rotating means for raising and lowering the free end portion of said valve lever.

3. In an acetylene gas generator, a generator; a generator bell; a bracket secured on the upper edge of said generator bell and projecting therefrom; a water tank; water conducting means for conducting water from said tank into said generator; a valve for controlling flow of water through said water conducting means; a stem for said valve projecting vertically upward therefrom adjacent to said generator bell; a valve lever having one of its ends pivotally secured to the upper end of said stem and its free end portion adapted to be rotated downward thereon; an extending arm secured to said stem, said arm having a depending arm member secured to the outer end thereof; a latch having one of its ends pivotally secured to the lower end of said arm member by a pivot and its free end projecting therefrom toward said bell and adapted to be moved downward by said bracket for closing said valve; a latch finger formed with and extending laterally from the upper edge of said latch and behind said depending arm member adapted thereby to limit the downward rotation of said latch upon its pivot, said finger also being adapted to be moved by the lower end of said valve lever when the free end portion of same is rotated downward against said finger, and thereby rotate said latch upon its pivot to a position out of the line of travel of said bracket.

4. In an acetylene gas generator, a generator for generating gas; a water tank; water conducting means for conducting water from said tank into said generator; a shut-off cock in said water conducting means, having a rotatable cock stem therefor whereby said water conducting means is closed and opened; a generator bell, adapted to be moved vertically and to be laterally rotated; bell guiding members secured to said bell; vertically arranged and supported guides adapted to guide said guiding members, said vertically arranged guides having open spaces beneath the lower ends thereof through which said bell guiding members are adapted to be passed by lateral rotation of said bell; a gate secured on said shut-off cock stem, said gate being adapted to normally close one of said open spaces; gas storing means; gas conducting means adapted to conduct gas from said generator into said gas storing means; a gas directing cock in said gas conducting means, said cock being provided with a rotatable cock gate therein and with a stem for rotating said gate; rod and crank connections whereby said gate is connected with said gas directing cock stem and rotating means on the latter cock stem for rotating the same.

5. In an acetylene gas generator, a generator adapted to have acetylene gas generated therein; a bell adapted to receive said gas and be raised thereby, and to be lowered by the gravity of said bell; a feed water tank, adjacent to said generator; feed water conducting means adapted to conduct water by the gravity thereof, from said tank into said generator; a valve for closing and opening said water conducting means, a stem for said valve, projecting upward therefrom; a valve lever having one of its ends pivotally secured to the upper end of said valve stem and its other or free end provided with a weight formed therewith adapted to be lifted by said bell for closing said valve, and to be lowered by the gravity thereof for opening said valve; a pawl pivotally secured to said lever between said stem and said weight, said pawl being provided with a pawl lever extending therefrom and parallel with said valve lever; an upright having its lower end secured on said water tank and its upper end portion extended between said pawl lever and said valve lever, for laterally guiding the same; a plurality of ratchets formed on a portion of said upright adapted to be engaged by said pawl, for forming a movable fulcrum for said valve lever; a stud pin secured to said pawl lever and adapted to contact said upright and normally retain said pawl in said engagement; a stud secured to said upright at the upper end thereof for limiting the upward movement of the central portion of said valve lever; lifting means for lifting said valve lever and disengaging means on said lifting means, for disengaging said pawl from said ratchets when said lifting means is lowered.

6. In an acetylene gas generator, in combination, a generator; a generator bell adapted to be raised by volume of gas therein and to be lowered by the gravity of said bell; guiding members carried by said bell for guiding the same; vertical guides for guiding said members, said guides being formed with spaces thereunder adapted to have said guiding members passed therethrough by lateral rotation of said bell for liberating said guiding members from said guides; gas storing means; a water tank; water conducting means adapted to conduct water from said tank into said generator; a shut-off cock in said water conducting means, said cock being provided with a rotatable cock stem therefor; a bell guide gate secured on said shut-off cock stem, said gate being adapted to normally close one of said bell guide spaces and to be rotated therefrom for opening said space; a controlling valve for controlling flow of water through said water conducting means, said valve being provided with a valve stem; a valve lever, one end of which is pivotally secured to said valve and the other end projected over the top of said generator bell; a valve lever rod having its lower end pivotally secured to said gate and its upper end portion slidably secured to said valve lever, said rod being provided with lifting means thereon for lifting said lever and with lowering means on the upper end portion thereof whereby said lever is lowered to a position from over said generator bell; gas conducting means adapted to conduct gas from said generator bell into said storing means; a gas directing cock in said gas conducting means, said cock being provided with a rotatable cock gate therein, a stem for said gate and with rotating means for rotating said stem, and rod and crank connections whereby said gas directing cock stem and said bell guide gate are connected, for moving said gate and the thereto attached parts when said stem is rotated.

In testimony whereof I affix my signature in the presence of two witnesses.

EDWARD F. KAPUS.

Witnesses:
 CARRIE STUBER,
 LOUISA MUELLER.